United States Patent [19]

Kistler

[11] 4,166,997

[45] Sep. 4, 1979

[54] LOAD DISC

[75] Inventor: Walter P. Kistler, Redmond, Wash.

[73] Assignee: Kistler-Morse Corporation, Bellevue, Wash.

[21] Appl. No.: 900,521

[22] Filed: Apr. 27, 1978

[51] Int. Cl.$^2$ ............................................. G01L 1/22
[52] U.S. Cl. ................................... 338/5; 73/141 A
[58] Field of Search .............. 338/5, 2, 42; 73/141 A, 73/88.5 SD

[56] References Cited

U.S. PATENT DOCUMENTS 3,221,283  11/1965  Ziggel .................................... 338/42

FOREIGN PATENT DOCUMENTS 1421107  11/1965  France .................................. 73/141 A

*Primary Examiner*—C. L. Albritton
*Attorney, Agent, or Firm*—Seed, Berry, Vernon & Baynham

[57] ABSTRACT

A load disc having an annular flex plate connected to a pair of parallel mounting plates through respective support rings. The support rings are of unequal diameters so that compressive or tensile forces applied to the mounting plates cause the flex plate to spherically deform. The deformation of the flex plate produces tensile and compressive strains on opposite faces of the flex plate which are measured by strain gauges mounted on opposite faces of the flex plate. The flex plate is recessed away from the support rings at the points of attachment thereto so that the support rings intersect the flex plate at its neutral plane. Consequently, spherical deformation of the flex plate does not tend to expand or contract the support rings thereby allowing freer deformation of the flex plate and desensitizing the flex plate against lateral forces applied between the mounting plates. The load disc is typically employed beneath the foot pad of a vertical member in order to measure the quantity of material contained in a vessel which is supported by the vertical member.

9 Claims, 8 Drawing Figures

LOAD DISC

BACKGROUND OF THE INVENTION

1. Field of the Invention

This invention relates to load cells, and more particularly, to a low-profile cylindrical load disc having a pair of spaced apart, cylindrical mounting plates which are bolted to respective structural members.

2. Description of the Prior Art

A wide variety of material are commonly stored in vessels such as bins or silos. Various means are available and commonly used which measure the quantity of material in the vessel by measuring the level of the material within the vessel. However, there are many instances where it is desirable to measure the weight of the material in the vessel rather than the volume or level. Attempts have been made in the past to weigh the vessel, and hence the material in the vessel, by placing the entire structure on load cells. These load cells typically include an elongated cylindrical member having a domed upper surface and a cylindrical flange formed on its lower surface. The flange is bolted to a mounting pad, and a structural member rests upon the domed upper surface of the cylindrical member. These structures unduly increase the height, and hence center of gravity, of such vessels and they are generally incapable of providing sufficient resistance to lateral forces. Tall outdoor silos supported by these load cells are susceptible to toppling over in high winds or earthquakes.

SUMMARY OF THE INVENTION

It is an object of the invention to provide a load cell having a low profile so that it may be placed beneath a structural member without unduly increasing the length of the structural member.

It is another object of the invention to provide a load cell which is positively secured between two structural members.

It is still another object of the invention to provide a load cell which is insensitive to lateral forces.

It is a further object of the invention to provide a load cell employing a strain instrumented flex plate which is supported at its neutral plane so that the flex plate may deform without the need for the flex plate's support structure to deform.

These and other objects of the invention are accomplished by a load disc utilizing a cylindrical flex plate secured between a pair of mounting plates. The flex plate carries a pair of strain gauges on its opposite faces for measuring load induced deformation of the flex plate. The flex plate is connected to the mounting plates by respective support rings of unequal diameter. The support rings attach to the flex plate at the neutral plane of the flex plate so that the flex plate is free to deform without imparting radial stress to the mounting rings. The mounting plates are positioned between a pair of support members by bolting the respective support plates thereto so that the load disc is able to resist lateral forces.

DETAILED DESCRIPTION OF THE INVENTION

Figure 1:
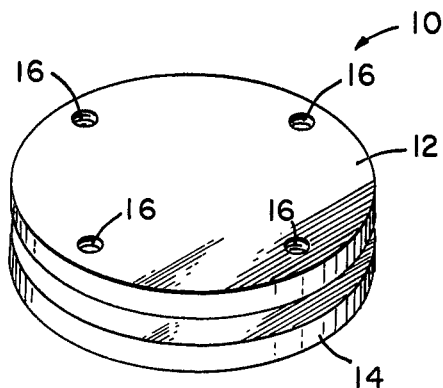
FIG. 1 is an isometric view of the load disc.
Figure 2:
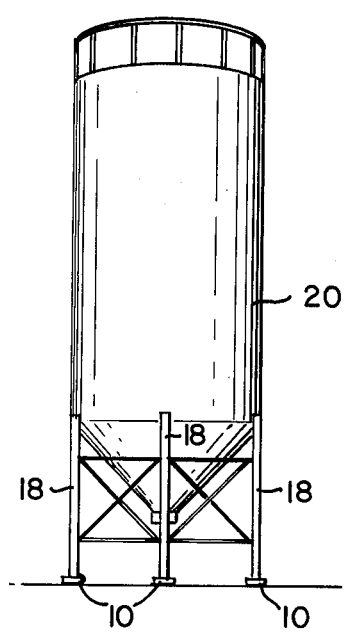
FIG. 2 is an elevational view illustrating the load disc installed in the support structure of a bin or silo.

With reference to FIG. 1, the external features of the load disc 10 include an upper mounting plate 12, and a lower mounting plate 14 spaced apart from each other. The upper plate 12 includes a plurality of threaded bolt holes 16 which are utilized to fixedly secure the load disc 10 to the underside of a structural member 18 as illustrated in FIG. 2. The structural members 18 support a cylindrical silo or bin 20. Since the load discs 10 are placed beneath the support members 18, the quantity of material in the silo 20 is indicated by the output of the load discs 10.

Figure 3:
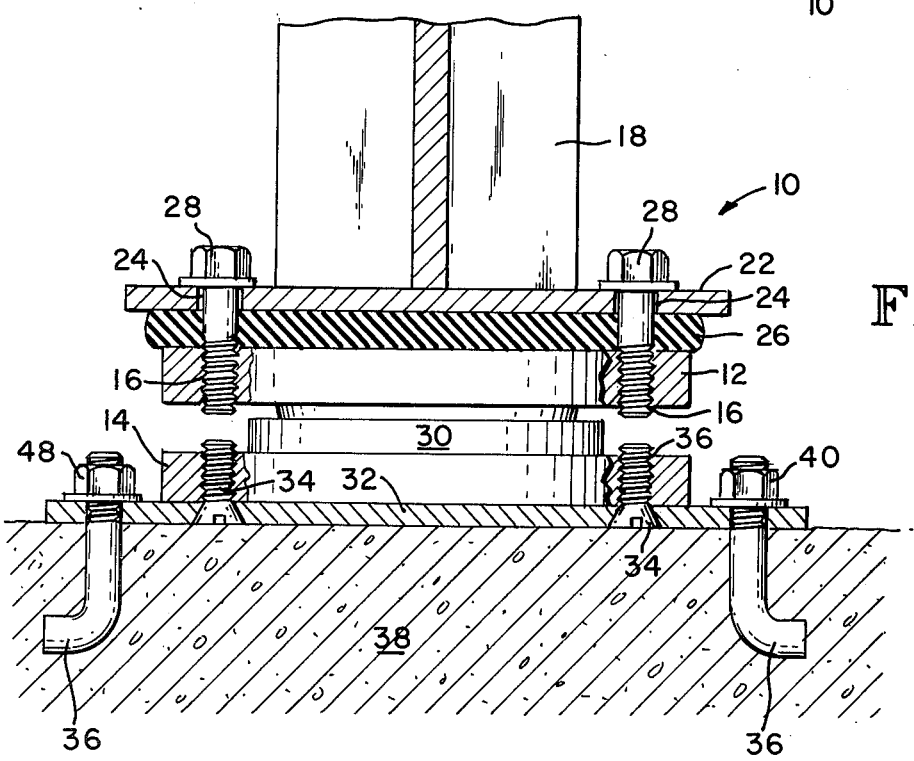
FIG. 3 is a cross-sectional view of the load disc bolted to a concrete floor and to the foot pads of a support structure.

The installation features of the load discs 10 are illustrated in greater detail in FIG. 3. The support structure 18 may be of I-beam configuration, and it terminates in a planar foot pad 22. The foot pad 22 contains a plurality of apertures 24 which are aligned with the apertures 16 in the upper mounting plate 12. A resilient pad 26 is placed between the foot pad 22 and the upper mounting plate 12, and bolts 28 are inserted through the foot pad 22 and resilient pad 26 and received by the bolt hole 16 in the upper mounting plate 12. The apertures 24 in the foot pad 22 are slightly larger than the outside diameter of the bolts 28 so that the structural members 18 may move laterally to some degree responsive to thermal variations, wind and other environmental stimuli without unduly imparting lateral stress to the mounting plate 12.

The upper mounting plate 12 is connected to the lower mounting flange 14 through a flexible inner plate 30 described in detail hereinafter. The flex plate 30 flexes responsive to forces imparted between the mounting plates 12, 14 in a normal direction and it is instrumented with strain gauges to provide an indication of the magnitude of the force.

The lower mounting plate 14 is secured to an adapter plate 32 by screws 34 received in threaded bores in the lower mounting plate 14. The adapter plate 32 is, in turn, secured to threaded anchors 36 imbedded to a concrete floor 38 by nuts 40. Although the mounting structure illustrated in FIG. 3 is preferably utilized, other techniques for securing the mounting plates 12, 14 to load receiving members may be utilized.

Figure 4:
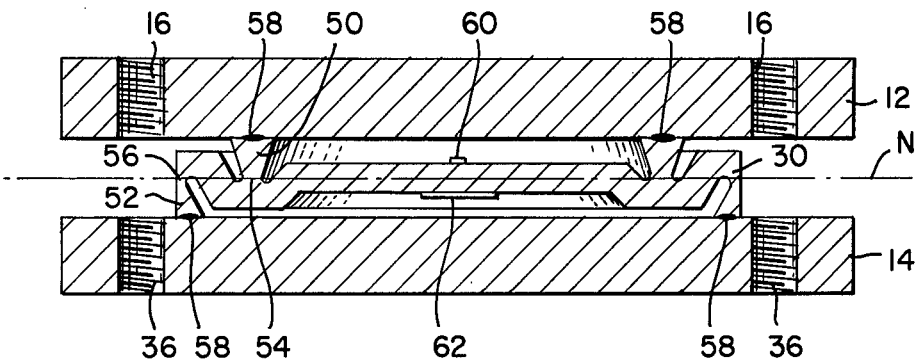
FIG. 4 is a cross-sectional view of the load disc.

The structural details of the flex plate 30 are illustrated in FIG. 4. The flex plate 30 includes upper and lower support rings 50, 52, respectively, of unequal diameters which are connected to the upper and lower mounting plates 12, 14, respectively. The support rings 50, 52 are connected to the flex plate 30 through thin webs 54, 56, respectively, and are solidly secured to the upper and lower mounting plates 12, 14, respectively, through welds 58.

The flex plate 30 is shaped so that the webs 54, 56 are positioned at a neutral plane end of the flex plate 30. This arrangement allows the flex plate 30 to bend more freely without the need for the support rings 50, 52 to expand or contract to accommodate such bending. Furthermore, extraneous lateral forces applied to the mounting plates 12, 14 are less apt to cause deflection of the flex plate 30 since they are transmitted to the plate 30 near its neutral plane. The relatively thin webs 54, 56 provide a great deal of flexibility at the point of attachment between the flex plate 30 and support rings 50, 52 to allow freer deflection of the flex plate 30.

The flex plate 30 and support rings 50, 52 may be integrally formed by turning a single metal disc on a lathe. The resulting plate 30 and rings 50, 52 are thus entirely symmetrical about the center of the plate 30.

A compressive load applied between the mounting plates 12, 14 causes the flex plate 30 to spherically deform with the center of the flex plate 30 moving downwardly. Conventional strain gauges 60, 62 are secured to the upper and lower surfaces, respectively, of the flex plate 30 to measure the degree of flex and hence the magnitude of the compressive load. Similarly, tensile loads applied between the mounting plates 12, 14 cause the flex plate 30 to spherically deform with the center of the flex plate 30 moving upwardly.

Figure 5:
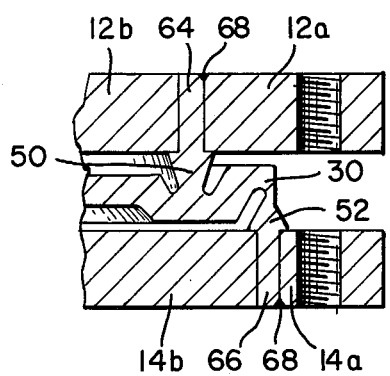
FIG. 5 is a cross-sectional view of the load disc illustrating an alternative technique for securing the flex plate to the mounting plates.

An alternative technique for securing the support rings 50, 52 to the upper and lower mounting plates 12, 14 is illustrated in FIG. 5. In this embodiment the mounting plates 12 are machined in two pieces to form mounting flanges 12a, 14a and inner cover plates 12b, 14b. Elongated extensions of the support rings 64, 66 are positioned between the flanges 12a, 14a, and cover plates 12b, 14b, respectively, and secured thereto by welds 68.

Figure 6:
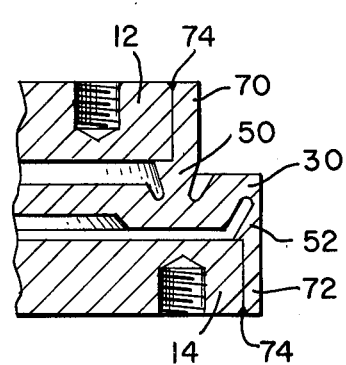
FIG. 6 is a cross-sectional view of the load disc illustrating still another technique for securing the flex plate to the mounting plates.

Still another technique for securing the support rings 50, 52 to the mounting plates 12, 14 is illustrated in FIG. 6. In this embodiment annular projections 70, 72 of the rings 50, 52, respectively, extend around the outer peripheries of the mounting plates 12, 14, respectively. The inside diameters of the annular projections 70, 72 are slightly larger than the outside diameters of the mounting plates 12, 14 to provide clearances 74 therebetween which receive a suitable bonding agent. Alternatively, the projections 70, 72 may be welded to the mounting plates 12, 14, respectively.

Figure 7:
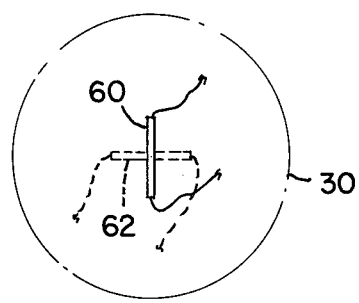
FIG. 7 is a schematic illustrating one technique for instrumenting the flex plate with strain gauges.
Figure 8:
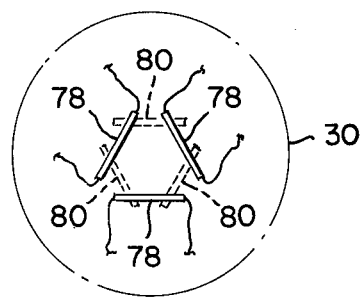
FIG. 8 is a schematic illustrating an alternative technique for instrumenting the flex plate with strain gauges.

Bending of the flex plate 30 generates tensile strains on its convex surface and compressive strains on its concave surface. These strains cause the strain elements 60, 62 bonded to these surfaces to increase their electrical resistance on the tension side and decrease their resistance on the compressive side as is well known in the art. The strain elements 60, 62 are connected in a half-bridge arrangement in a conventional manner so as to provide a voltage signal which is proportional to the compressive or tensile loading of the mounting plates 12, 14. A minimum of two strain elements are required in order to compensate for common mode effects such as temperature variations. The strain gauges 60, 62 are preferably arranged near the center along a diameter of the flex plate 30. In order to properly respond to the two orthagonal components of the spherical deformation of the plate, the two strain sensing elements 60, 62 should be arranged perpendicular to each other as illustrated in FIG. 7. Alternatively, six strain sensing elements may be used with three of the strain sensing elements 78 bonded to one surface of the flex plate 30 and the remaining strain sensing elements 80 secured to the opposite face of the flex plate 30. All of the strain elements are electrically connected in series, and as with the arrangement of FIG. 7, are connected in a circuit to form a half bridge in a conventional manner.

In order to achieve high sensitivity of the instrument, i.e. in order to generate a large output signal with relatively little strains, conventional semi-conductor strain sensing elements can be used. Such strain sensing elements consist of small fibers of approximately six-thousandths of an inch in diameter and one-quarter of an inch in length. The fibers are cut from a single crystal of lightly doped silicon. Their electrical resistance is typically around 1,000 ohms.

The load disc of the present invention thus has a relatively low profile, and both its upper and lower mounting elements are rigidly secured to structural members so that the load disc is capable of restraining lateral forces.

I claim:

1. A load disc, comprising:
   first and second mounting plates each having means for securing said plates to respective structural members;
   first and second annular support rings of unequal diameter projecting from said first and second mounting plates, respectively; and
   a generally cylindrical flex plate having strain sensing means secured thereto for providing an electrical indication of the strain sensed by said strain sensing means; said flex plate having formed therein first and second annular recesses on opposite faces of said flex plate having diameters corresponding to the diameters of said first and second annular support rings, respectively, the ends of said first and second support rings being secured to said flex plate within said first and second recesses, respectively, with the line of attachment between said support rings and said flex plate being positioned near the neutral plane of said flex plate thereby minimizing radial forces on said support rings responsive to deformation of said flex plate.

2. The load disc of claim 1 wherein said support rings are relatively thin at the line of attachment to said flex plate such that said flex plate is free to deflect with relatively little retraint from said support rings.

3. A load disc, comprising:
   a generally cylindrical flex plate having strain sensing means secured thereto for providing an electrical indication of the strain sensed by said strain sensing means;
   first and second mounting plates each having means for securing said plates to respective structural members; and
   first and second annular support rings of unequal diameter extending from opposite faces of said flex plate to said first and second mounting plates, respectively, such that compressive to tensional loads applied between said plates cause said flex plate to spherically deform thereby producing an electrical indication of the magnitude of said load, said support rings having diameters which are smaller than the diameter of the mounting plate to which they are secured thereby forming mounting flanges at the peripheries of said mounting plates.

4. The load disc of claim 3 wherein a plurality of threaded bores are formed in said mounting flanges to allow said mounting plate to be rigidly secured to structural members.

5. A load disc, comprising:
a generally cylindrical flex plate having a semiconductor silicon crystal mounted on each face of said flex plate near the center of said plate, said crystals running perpendicular to each other in order to provide an electrical signal responsive to mutually orthagonal strains;
first and second mounting plates each having means for securing said plates to respective structural members; and
first and second annular support rings of unequal diameter extending from opposite faces of said flex plate to said first and second mounting plates, respectively, such that compressive or tensional loads applied between said plates cause said flex plate to spherically deform thereby producing an electrical indication of the magnitude of said load.

6. A load disc, comprising:
a generally cylindrical flex plate having three semiconductor strain elements secured to each face of said flex plate in an equilateral triangle substantially concentric with the center of said flex plate;
first and second mounting plates each having means for securing said plates to respective structural members; and
first and second annular support rings of unequal diameter extending from opposite faces of said flex plate to said first and second mounting plates, respectively, such that compressive or tensional loads applied between said plates cause said flex plate to spherically deform thereby producing en electrical indication of the magnitude of said load.

7. A load disc, comprising:
a generally cylindrical flex plate having strain sensing means secured thereto for providing an electrical indcation of the strain by said strain sensing means;
first and second mounting plates each having means for securing said plates to respective structural members; and
first and second annular support rings of unequal diameter extending from opposite faces of said flex plate and welded to said first and second mounting plates, resspectively, to prevent radial deformation of said support rings adjacent said mounting plates such that compressive or tensional loads applied between said plates cause said flex plate to spherically deform thereby producing an electrical indication of the magnitude of said load.

8. A load disc, comprising:
a generally cylindrical flex plate having strain sensing means secured thereto for providing an electrical indication of the strain sensed by said strain sensing means;
first and second mounting plates each having means for securing said plates to respective structural members; and
first and second annular support rings of unequal diameter extending from opposite faces of said flex plate to said first and second mounting plates, respectively, such that compressive or tensional loads applied between said plates cause said flex plate to spherically deform thereby producing an electrical indication of the magnitude of said load, said first and second support rings including respective first portions extending along the peripheral edges of said first and second mounting plates, respectively, and being secured thereto for preventing radial deformation of said support rings, said support rings further including respective second portions abutting the inner faces of said first and second mounting plates, respectively, in order to allow said support rings to transmit compressive or tensional loads from said mounting plates to said flex plate.

9. The load disc of claim 8 further including an annular retaining ring etending around each first portion of said support rings thereby restricting outward expansion of said support rings.

* * * * *

REEXAMINATION CERTIFICATE (368th)
United States Patent [19]
Kistler

[11] B1 4,166,997
[45] Certificate Issued Jul. 16, 1985

[54] LOAD DISC

[75] Inventor: Walter P. Kistler, Redmond, Wash.

[73] Assignee: Kistler-Morse Corporation, Bellevue, Wash.

Reexamination Request:
No. 90/000,654, Oct. 18, 1984

Reexamination Certificate for:
Patent No.: 4,166,997
Issued: Sep. 4, 1979
Appl. No.: 900,521
Filed: Apr. 27, 1978

[51] Int. Cl.³ .......................... G01L 1/22; G01L 1/26
[52] U.S. Cl. ..................................... 219/5; 73/862.65
[58] Field of Search ............................... 338/2, 5, 42; 73/862.65

[56] References Cited

U.S. PATENT DOCUMENTS

| | | | |
|---|---|---|---|
| 3,221,283 | 11/1965 | Ziggel | 338/4 |
| 3,433,064 | 3/1969 | Jacobson | 73/862.65 |
| 3,453,582 | 7/1969 | Birkholtz | 338/5 |
| 3,643,502 | 2/1972 | Birkholtz | 73/862.65 X |
| 3,866,157 | 2/1975 | Birkholtz | 338/5 |
| 4,020,911 | 5/1977 | English et al. | 177/136 |

OTHER PUBLICATIONS

Marks' Standard Handbook For Mechanical Engineers, Eighth Edition, 1978.

*Primary Examiner*—C. L. Albritton

[57] ABSTRACT

A load disc having an annular flex plate connected to a pair of parallel mounting plates through respective support rings. The support rings are of unequal diameters so that compressive or tensile forces applied to the mounting plates cause the flex plate to spherically deform. The deformation of the flex plate produces tensile and compressive strains on opposite faces of the flex plate which are measured by strain gauges mounted on opposite faces of the flex plate. The flex plate is recessed away from the support rings at the points of attachment thereto so that the support rings intersect the flex plate at its neutral plane. Consequently, spherical deformation of the flex plate does not tend to expand or contract the support rings thereby allowing freer deformation of the flex plate and desensitizing the flex plate against lateral forces applied between the mounting plates. The load disc is typically employed beneath the foot pad of a vertical member in order to measure the quantity of material contained in a vessel which is supported by the vertical member.

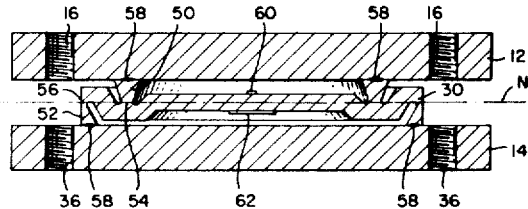

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-9 is confirmed.

* * * * *